United States Patent [19]

Livay et al.

[11] Patent Number: 5,359,568
[45] Date of Patent: Oct. 25, 1994

[54] FIFO MEMORY SYSTEM

[75] Inventors: Aviel Livay, Bney Brak; Ricardo Berger, Ramat Hasharon; Alexander Joffe, Rehovot, all of Israel

[73] Assignee: Motorola, Inc., Schaumburg, Ill.

[21] Appl. No.: 72,643

[22] Filed: Jun. 3, 1993

[30] Foreign Application Priority Data

Jun. 6, 1992 [GB] United Kingdom ............ 9212065.8

[51] Int. Cl.⁵ .................... G11C 7/00; G06F 12/00
[52] U.S. Cl. ................... 365/221; 340/825.05; 340/825.06; 395/425; 365/230.03
[58] Field of Search ............... 395/325, 425; 340/825.05, 825.06; 370/85.13, 85.4; 365/221, 230.03

[56] References Cited

U.S. PATENT DOCUMENTS

| | | | |
|---|---|---|---|
| 4,652,874 | 3/1987 | Loyer | 340/825.05 |
| 5,047,917 | 9/1991 | Athas et al. | 364/200 |
| 5,233,701 | 8/1993 | Nakata | 395/425 |

FOREIGN PATENT DOCUMENTS

0415862A2 6/1990 European Pat. Off. .

*Primary Examiner*—Viet Q. Nguyen

[57] ABSTRACT

This invention relates to a FIFO memory system (10) comprising a plurality of FIFO memories (20) for handling transmission queues in a serial digital communication system. The memory system comprises a plurality of blocks of memory (20a–c, 21a–e), each of the plurality of FIFO memories being assigned a block (20a) of the plurality of blocks of memory, the unassigned blocks of memory forming a block pool (21a–e). The memory system further comprises memory management means (LLT, PT) for adding at least one of the unassigned blocks of memory from the block pool to a FIFO memory on writing to the FIFO memory whereby the size of the FIFO memory is selectably variable, and for returning a block of memory from a FIFO memory to the block pool once the contents of the block of memory have been read.

8 Claims, 2 Drawing Sheets

FIFO MEMORY SYSTEM

BACKGROUND OF THE INVENTION

This invention relates to a FIFO memory system and more particularly to a FIFO memory system for use in a serial digital communication system.

With digital communication systems having two or more processes running concurrently, transmission queues are used in order that the processes can efficiently transmit data to a communication line through a serial channel in the system. A common method of managing the transmission queues through the serial channel is to map each queue into one of a plurality of First-in-First-Out (FIFO) memories. The FIFOs are written to or filled by the system and emptied or read from by the communication process or vice versa.

A problem with this method is implementing a plurality of FIFOs in a limited area. The preferred solution is to utilise RAM based FIFO memories since they appear to require the least area.

The filling rate of the FIFO (i.e. the rate at which data is written to the FIFO) should normally be greater than the emptying rate of the FIFO (i.e. the rate at which data is read from the FIFO) onto the communication line. Typically, the FIFO issues Data Requests to the system any time a danger of underrun exists: underrun means carrying out a read operation from the FIFO when it is empty.

The latency of the system bus carrying the data to be written must be considered in order to determine the minimum size of each FIFO. The latency of the bus is defined as the maximum period of time required by the system to supply the first data to the FIFO after a Data Request has been generated. For limited size memory FIFOs, the maximum latency required is a critical parameter of the system configuration.

If Ls is the system latency having units of time, Ft is the rate at which the FIFO is emptied by the communication process and WM is the minimum FIFO size below which Data Requests are generated and assuming the FIFO is full when the first data is read by the communication process then, $$WM = Ls * Ft \quad (1)$$

With a FIFO having a size WM, once the FIFO is filled to its full size, the data requests will stop. However, Data Requests will be asserted again once the first data read is generated by the communication process in order to avoid an underrun state. Data Requests will therefore be issued all the time.

In order to avoid this situation, a FIFO having a size WM+Delta must be implemented. When a Data Request is sensed by the system, the system will fill the FIFO to its maximum size (WM+Delta). However, the Data Request will be asserted again only after the FIFO is emptied below the WM level.

A queuing system may comprise n different FIFOs for n different queues so that the total memory size MS must be greater than:

$$MS = (WM1 + Delta1) + (WM2 + Delta2) + \ldots + (WMn + Deltan) \quad (2)$$

Assuming the FIFOs are n similar FIFOs and Delta=WM, equation 2 becomes $$MS = (2)(n)(WM)$$

Therefore, $$WM = \frac{MS}{2n} \quad (3)$$

From equation (1), $$Ls * Ft = (MS)/(2n) \quad (4)$$

And, $$Ls = (MS)/(2n) * Ft \quad (5)$$

Where Ls is the maximum latency acceptable to the memory system.

Thus, in order to account for the latency of the system bus and to avoid continuous Data Requests being generated, the above solution requires additional FIFO memory: that is, WM+Delta for each FIFO. The serial communication process can access only one FIFO at a time and this one FIFO should fill up to the size WM+Delta. Since the other FIFOs also occupy WM+Delta of memory when they only require WM of memory, with the above solution there is [(n−1)*Delta of unused bytes] of memory. Thus, large areas of memory are required but only a portion of the memory will be used at any one time.

SUMMARY OF THE INVENTION

In accordance with the present invention there is provided a FIFO memory system comprising a plurality of FIFO memories for handling transmission queues in a serial digital communication system, the memory system comprising:

a plurality of blocks of memory, each of the plurality of FIFO memories being assigned a block of the plurality of blocks of memory, the unassigned blocks of memory forming a block pool; and memory management means for adding at least one of the unassigned blocks of memory from the block pool to a FIFO memory on writing to the FIFO memory whereby the size of the FIFO memory is selectably variable, and for returning a block of memory from a FIFO memory to the block pool once the contents of the block of memory have been read.

Thus, in the FIFO memory system in accordance with the present invention, a FIFO has additional memory only when it needs it by dynamically applying small blocks of memory to the FIFOs on request.

The present invention therefore provides a method and apparatus by which the size of each of the plurality of FIFOs can be dynamically varied on writing to the FIFO. An advantage of this arrangement is that the latency of the bus system is accounted for and the continual issuance of data requests is avoided but the memory area available is efficiently utilized: only the FIFO which is transmitting utilizes WM+Delta of memory.

BRIEF DESCRIPTION OF THE DRAWINGS

A FIFO memory system in accordance with the present invention will now be described by way of example only with reference to the accompanying drawings in which.

DETAILED DESCRIPTION

Figure 1:
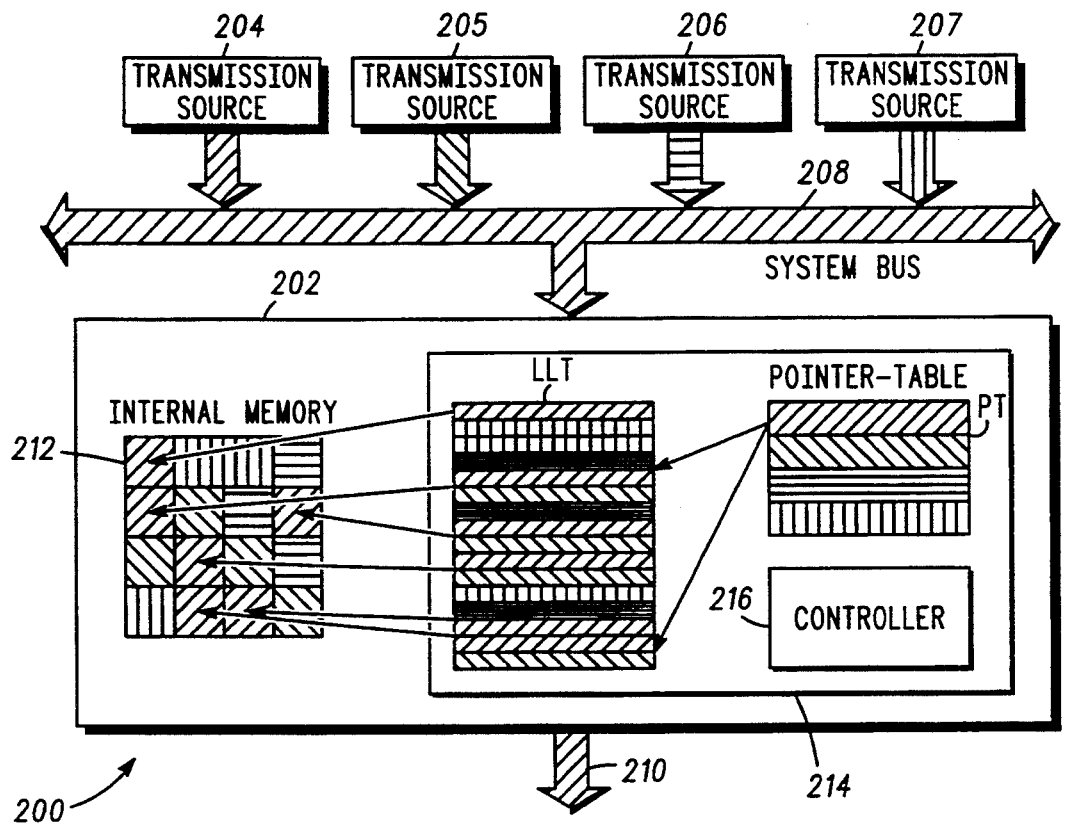
FIG. 1 shows a communication system incorporating a FIFO memory system in accordance with the present invention.

A communication system 200 incorporating a FIFO memory system 202 in accordance with a preferred embodiment of the present invention is shown in FIG. 1. Transmission sources 204-207 transmit data onto a system bus 208 which is coupled to the FIFO memory system 202. The FIFO memory system 202 transmits the data to transmission media (not shown) via a serial communication channel 210. The FIFO memory system 202 comprises internal memory 212 comprising a plurality of FIFOs for handling the transmission queues between the transmission sources 204-207 and the transmission media and a memory management block 214 for managing the data transmission queues.

Figure 2:
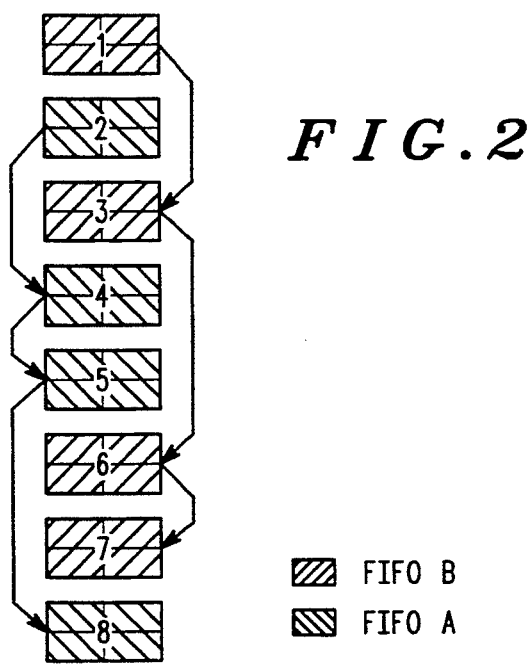
FIG. 2 shows part of a FIFO memory system in accordance with the present invention.

Referring now also to FIG. 2, the internal memory of the FIFO memory system (only part 10 of which is shown in FIG. 2) comprises a plurality of small blocks of memory: only eight, 1-8, are shown in FIG. 2.

Initially, each one of the plurality of FIFOs is assigned a small block of memory: for example FIFO A of FIG. 2 is assigned block 2 and FIFO B is assigned block 1. In a FIFO memory system having n FIFOs, a predetermined number of the small blocks determined by n will be assigned to the plurality of FIFOs. The remaining blocks 3-8 form a 'block pool' of memory from which all the plurality of FIFOs can 'borrow' when the FIFO requires additional memory.

As described in the introduction in order to avoid the continuous issuance of Data Requests during a read operation, (that is, when the FIFO is transmitting queued data) the FIFO should have a size of WM+Delta. The present invention allows a transmitting FIFO to borrow the additional memory (Delta) from the 'block pool' during a write operation. For example, assuming in this case Delta is equal to WM, a queued FIFO having a size of WM transmits data and during the write operation subsequent FIFO the transmitting increases its size to (2) (X WM) by taking additional blocks from the 'block pool'. A FIFO that has been written to but is in a queue occupies memory having a size WM.

Blocks are returned to the 'block pool' when the block has been emptied during a read operation. The 'block pool' thus provides means by which the size of each of the plurality of FIFOs can be dynamically varied.

Preferably, each FIFO is implemented as a linked list of blocks in which each block in the list points to the next block of the FIFO. A Link List Table (LLT) is implemented in the memory management block 214. The Link List Table LLT contains the same number of entries as the number of blocks in the memory and each entry stores the address of the next linked block in memory. Table 1 represents the link list table for the eight blocks 1-8 shown in FIG. 2. The lines on FIG. 2 also represent which blocks are linked.

TABLE 1

| Block | Next linked block |
| --- | --- |
| 1 | 3 |
| 2 | 4 |
| 3 | 6 |
| 4 | 5 |
| 5 | 8 |
| 6 | 7 |
| 7 | X |
| 8 | X |

For each one of the plurality of FIFOs, a Read Pointer (RP) and a Write Pointer (WP) are defined. The location of the Read Pointer and Write Pointer is stored in a pointer table PT in the memory management block 214. The pointer table PT is updated depending on the contents of the link list table.

Each time a block of memory is written to or read from, the corresponding entry in the link list table is read so as to determine the address of the next linked block. The Read Pointer RP or Write Pointer WP is then re-defined according to the address of the next linked block. Thus, the logical connection between memory blocks is implemented via the Link List Table LLT and the pointer table PT which are both controlled by a controller 216.

Read and write operations for one of the plurality of FIFOs in accordance with the present invention will now be described with reference to FIGS. 3 and 4.

A FIFO 20 is initially assigned a block 20a of memory. The Read and Write Pointers for FIFO 20 are defined according to the address of block 20a.

During a write operation, the FIFO block 20a is written to first and once this block has been filled the Write Pointer WP is updated so that it points to the next linked block whose address is stored in the entry for block 20a in the link list table. In the example shown in FIG. 3, the next block is block 20b. Blocks 20b and 20c are written to in an identical manner. Memory blocks 21a-e form part of the block pool.

Once block 20c has been filled, FIFO 20 borrows a block from the block pool according to the entry for 20c in the link list table whereby the Write Pointer WP points to block 21 a of the block pool.

Figure 3:
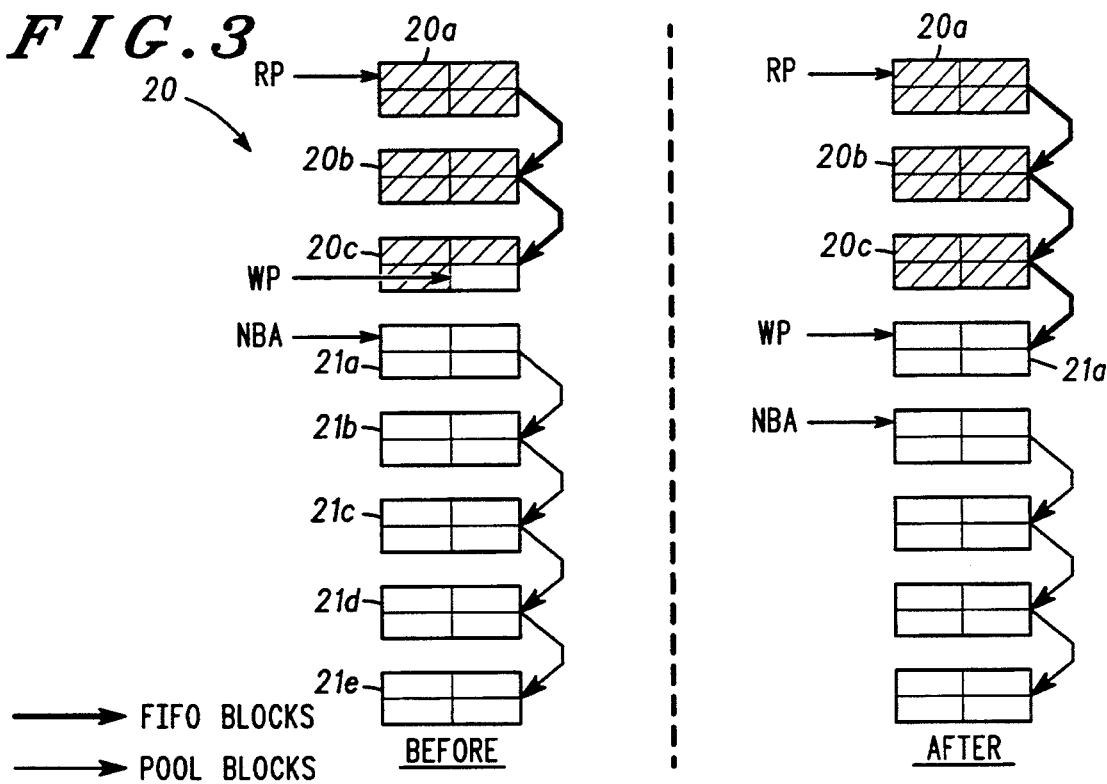
FIG. 3 shows part of the FIFO memory system in accordance with the present invention during a write operation.

Preferably, the block pool is also implemented as a linked list of blocks having a stack structure as shown in FIG. 3. Thus, any block returned to the pool will be the first block available to a FIFO requiring it during a write operation. NBA (Next Block Available) indicates the top of the stack.

If FIFO 20 requires additional blocks, data will be written to blocks 21b-e in an order which depends on the link list table entries for these blocks.

Each one of the plurality of FIFOs uses a predetermined number of the small blocks of memory so as to occupy an area of memory having a size WM which is defined by the user. As discussed above the WM size determines the minimum level below which Data Requests are issued and depends on the latency of the system.

Figure 4:
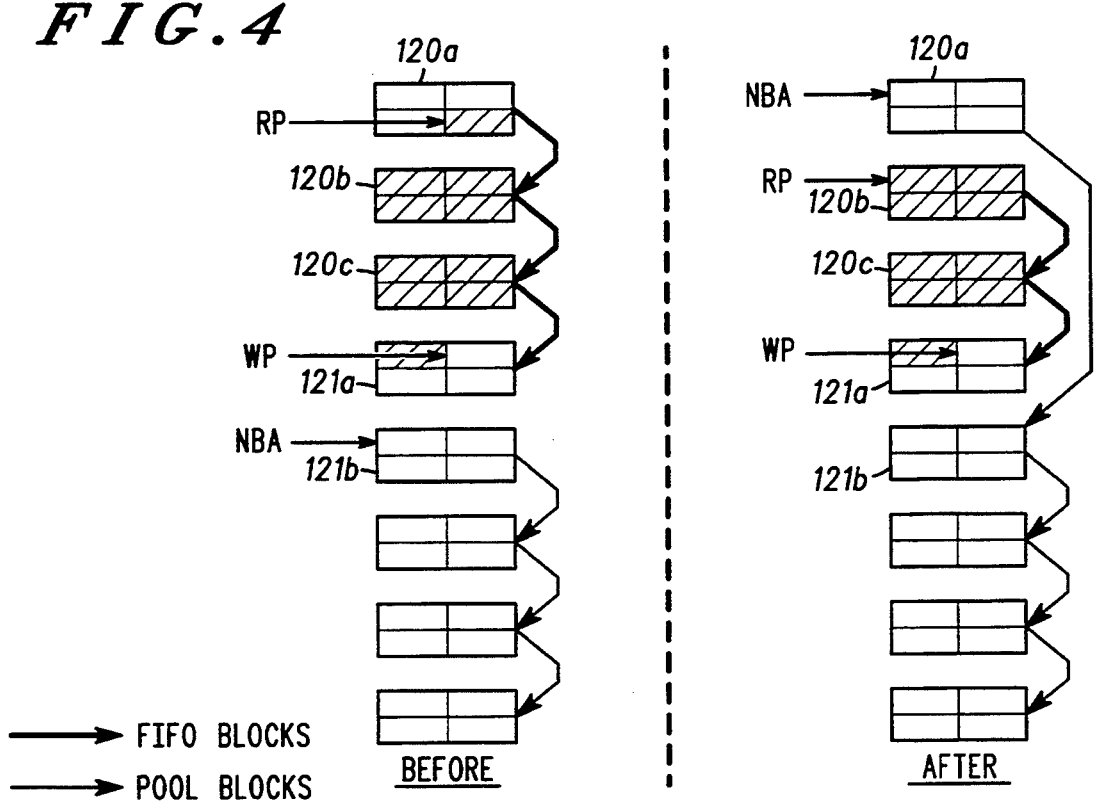
FIG. 4 shows part of the FIFO memory system in accordance with the present invention during a read operation.

Referring now also to FIG. 4 (like components to those of FIG. 3 are referred to by the same reference numeral plus a hundred), during a read operation data is read from the blocks according to where the Read Pointer is pointing. Data is thus read from block 120a and once this block has been emptied the Read Pointer RP is updated so that it points to the next block of the FIFO according to the entry for block 120a in the link list table. In the example shown in FIG. 4 the next block is block 120b. Data is then read from block 120b. Once block 120a has been emptied, the block becomes part of the block pool and is placed at the top of the stack as indicated by NBA, The entry in the link list table for block 120a is then updated so that its next linked block is the next available block in the pool: that is block 21b. Thus, block 120a will be the first block from the block pool to be written to during a following write operation.

The invention recognizes that the communication process can only read one FIFO at a specific time and so only one FIFO at any time requires additional memory of size Delta in order to avoid underrun. Thus, for n FIFOs, the total memory size MS is given by $$MS = (WM1 + WM2 + WM3 + WMn) + Delta \quad (6)$$

Assuming the FIFOs are n similar FIFOs and Delta=WM, equation 6 becomes $$MS = nWM + WM - WM(n+1) \quad (7)$$

Substituting WM from equation 7 into equation 1 and rearranging gives $$Ls = (MS)/[(n+1)*Ft] \quad (8)$$

Where Ls is the maximum latency acceptable to the memory system.

Thus, it is clear from comparing equations 8 and 5, for n>1, that the maximum latency supported by the FIFO memory system in accordance with the present invention is bigger than the maximum latency supported by the conventional solution described in the introduction. From a different point of view, if the latencies of the systems Ls are the same, the total memory size required by the memory system in accordance with the present invention is reduced. Thus, the memory system in accordance with the present invention more efficiently utilizes the memory available.

It will be appreciated that the present invention provides a FIFO memory system which optimizes the latency of the bus system. Furthermore, the memory system in accordance with the invention can be relatively easily adapted to system buses having different latencies.

The plurality of FIFOs, the link list table and the pointer table are preferably all implemented in RAM.

Accessing a FIFO (i.e. a write or read operation) requires only one read from the link list table (LLT) and one write to the LLT. The same applies for the pointer table (PT). The LLT and PT are preferably implemented using dual ported RAMs whereby one read and one write can be done during the same memory cycle. This means that the preferred FIFO memory system is capable of updating the tables LLT and PT during the same cycle in which a FIFO is accessed. Thus, managing the FIFOs does not require any wait states and the memory system can be accessed each cycle.

A preferred embodiment of the present invention has been implemented in a FDDI (Fibre Distributed Data Interface) system interface. In this implementation, a memory array comprising 256 blocks of memory supported 30 FIFOs.

Those skilled in the art will recognize that modifications and variations can be made without departing from the spirit of the invention. Therefore, it is intended that this invention encompass all such variations and modifications as fall within the scope of the appended claims.

We claim:

1. A first-in, first-out (FIFO) memory system comprising a plurality of FIFO memories for handling a predetermined number of transmission queues in a serial communication system, only one of said plurality of FIFO memories transmitting data stored therein at a time, the memory system comprising:

a plurality of blocks of memory, each of the plurality of blocks of memory having an information content, and each of the plurality of FIFO memories being assigned a respective, different block of the plurality of blocks of memory, unassigned blocks of memory forming a block pool; and memory management means for adding at least one of the unassigned blocks of memory from the block pool to a FIFO memory on writing to said FIFO memory, each of said plurality of FIFO memories having a respective size which is selectively variable when not transmitting queued data up to a predetermined maximum size, and for returning the at least one of the unassigned blocks of memory from said FIFO memory to said block pool once all of said information content of said at least one of the unassigned blocks of memory has been transmitted, said memory management means, in response to determining that any of said plurality of FIFO memories is transmitting queued data, increasing the size of a transmitting FIFO memory to be more than said predetermined maximum size by adding at least one of said unassigned blocks of memory from said block pool to said transmitting FIFO memory in response to writing thereto.

2. The FIFO memory system of claim 1 further comprising m linked blocks of memory, m being an integer, and wherein the memory management means comprises a link table having m entries, each of the m entries being associated with a respective one of said m linked blocks of memory and holding the address of a next block of memory to be linked to respective one of said m linked blocks of memory.

3. The FIFO memory system of claim 2 wherein the memory management means further comprises a pointer table having a read pointer entry and a write pointer entry for each one of said plurality of FIFO memories, said read pointer entry indicating a next block of the respective FIFO memory which is to be read from and said write pointer entry indicating a next block of the respective FIFO memory which is to be written to, the memory management means updating the read or write pointer entries in dependence on respective block entries in said link table after respectively reading or writing.

4. The FIFO memory system of claim 1 wherein said plurality of FIFO memories and said plurality of blocks of memory are implemented as random access memory (RAM).

5. A communication system comprising:
a plurality of transmission sources;
a bus coupled to receive data transmitted from the plurality of transmission sources;
a first-in, first-out (FIFO) memory system for handling the transmitted data, the FIFO memory system comprising a plurality of FIFO memories for queuing the transmitted data; and a serial communication channel for serially transmitting data queued in said FIFO memory system, only one of said plurality of FIFO memories transmits queued data to the serial communication channel at a time, the memory system comprising:

a plurality of blocks of memory, each of said plurality of FIFO memories being assigned a respective, different block of said plurality of blocks of memory, unassigned blocks of memory forming a block pool, and memory management means for adding at least one of said unassigned blocks of memory from said block pool to a FIFO memory on writing data to said FIFO memory whereby the size of each of said plurality of FIFO memories is selectively variable up to a predetermined maximum size, and for returning said at least one of said unassigned blocks of memory from said FIFO memory to the block pool once information content of all of said at least one of said unassigned blocks of memory has been transmitted, said memory management means, in response to determining that any of said plurality of FIFO memories is transmitting queued data, increases the size of a transmitting FIFO memory to be more than said predetermined maximum size by adding at least one of said unassigned blocks of memory from said block pool to said transmitting FIFO memory in response to writing thereto.

6. The communication system of claim 5 further comprising m linked blocks of memory, where m is an integer, and wherein said memory management means comprises a table having m entries, each of said m entries being associated with a respective one of said m linked blocks of memory and holding an address of a next block of memory to be linked to the respective one of said m linked blocks of memory.

7. The communication system of claim 6 wherein said memory management means further comprises a pointer table having a read pointer entry and write pointer entry for each one of the said plurality of FIFO memories, said read pointer entry indicating a next block of a respective FIFO memory which is to be read from and said write pointer entry indicating a next block of a respective FIFO memory which is to be written to, said memory management means updating the read or write pointer entries in dependence on respective block entries in the link table after respectively reading or writing.

8. The communication system of claim 5 wherein said plurality of FIFO memories and said plurality of blocks of memory are implemented as random access memory (RAM).

* * * * *